(12) United States Patent
Kishima et al.

(10) Patent No.: US 10,207,742 B2
(45) Date of Patent: Feb. 19, 2019

(54) VEHICLE STRUCTURE AND MANUFACTURING METHOD FOR VEHICLE STRUCTURAL COMPONENT

(71) Applicant: TOYOTA JIDOSHA KABUSHIKI KAISHA, Toyota-shi, Aichi-ken (JP)

(72) Inventors: Fumihiko Kishima, Konan (JP); Koji Amemiya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/623,739

(22) Filed: Jun. 15, 2017

(65) Prior Publication Data

US 2018/0015957 A1 Jan. 18, 2018

(30) Foreign Application Priority Data

Jul. 12, 2016 (JP) .................................. 2016-137982

(51) Int. Cl.
*B62D 25/06* (2006.01)
*B62D 29/00* (2006.01)
(Continued)

(52) U.S. Cl.
CPC ........... *B62D 25/06* (2013.01); *B62D 29/002* (2013.01); *B62D 29/043* (2013.01); *B29C 44/1228* (2013.01); *B29C 44/3415* (2013.01); *B29C 44/3484* (2013.01); *B29K 2023/06* (2013.01); *B29K 2023/12* (2013.01); *B29K 2025/06* (2013.01); *B29K 2105/04* (2013.01); *B29K 2105/06* (2013.01); *B29K 2705/00* (2013.01);
(Continued)

(58) Field of Classification Search
CPC .. B62D 29/002; B62D 29/004; B62D 29/005; B62D 25/06
USPC .................. 296/210, 203.01, 203.03, 187.02
See application file for complete search history.

(56) References Cited

U.S. PATENT DOCUMENTS 5,671,968 A * 9/1997 Masuda ............... B62D 21/157
296/187.12
8,276,974 B2 * 10/2012 Vilcek .................... B29C 44/18
296/187.02
(Continued)

FOREIGN PATENT DOCUMENTS

JP 2002-173049 A 6/2002
JP 2009-120157 A 6/2009
JP 2009-120161 A 6/2009

*Primary Examiner* — Dennis H Pedder
(74) *Attorney, Agent, or Firm* — Oliff PLC

(57) ABSTRACT

A vehicle structure includes: a framework member; an outer panel disposed at the outer side of the framework member, and that configures a design face of the vehicle; a foamed member disposed as a reinforcing material between the framework member and the outer panel, and that is formed from a material foamed at a first temperature from a precursor state and then solidifies at a second temperature lower than the first temperature; and a reinforcement member that is interposed between the outer panel and the foamed member in a state in which the outer panel and the foamed member are respectively joined together so as to fix the foamed member to the outer panel, and that is configured from a material having a smaller shrinkage ratio than a shrinkage ratio of the foamed member when the temperature is lowered from the first temperature to the second temperature.

7 Claims, 6 Drawing Sheets

(51) Int. Cl.
  *B62D 29/04* (2006.01)
  *B29C 44/34* (2006.01)
  *B29K 105/04* (2006.01)
  *B29L 31/30* (2006.01)
  *B29K 707/04* (2006.01)
  *B29K 23/00* (2006.01)
  *B29K 25/00* (2006.01)
  *B29C 44/12* (2006.01)
  *B29K 105/06* (2006.01)
  *B29K 705/02* (2006.01)
  *B29K 709/08* (2006.01)
  *B29K 705/00* (2006.01)

(52) U.S. Cl.
  CPC ...... *B29K 2705/02* (2013.01); *B29K 2707/04* (2013.01); *B29K 2709/08* (2013.01); *B29L 2031/3002* (2013.01)

(56) References Cited

U.S. PATENT DOCUMENTS 8,511,743 B2 * 8/2013 Kraushaar .............. B62D 21/15
                                                        296/187.02
9,187,132 B2 * 11/2015 Arikai .................... B62D 25/04

\* cited by examiner

VEHICLE STRUCTURE AND MANUFACTURING METHOD FOR VEHICLE STRUCTURAL COMPONENT

CROSS-REFERENCE TO RELATED APPLICATIONS

This application is based on and claims priority under 35 USC 119 from Japanese Patent Application No. 2016-137982 filed on Jul. 12, 2016, the disclosure of which is incorporated by reference herein.

BACKGROUND

Technical Field

The present disclosure relates to a vehicle structure and a manufacturing method for a vehicle structural component.

Related Art

Structures are known in which a foamed member is locally disposed between an outer panel and a member disposed at a vehicle inner side of a vehicle (for example, see Japanese Patent Application Laid-Open (JP-A) Nos. 2009-120157, 2009-120161, and 2002-173049). For example, JP-A No. 2009-120157 describes a structure in which a closed cross-section space is formed between an outer panel, configured from a thin plate and having a hat-shaped cross-section, and a center pillar stiffener, serving as a reinforcing member disposed at an inner side of the outer panel; and a foamed filler material is disposed in the closed cross-section space.

In the process in which the foamed filler material is cooled and solidifies after the foamed filler material is foamed, foamed filler material adhering to the outer panel attempts to contract so as to warp the outer panel. When this occurs, the foamed filler material adhering to the outer panel solidifies while contracting, and there is a concern regarding warping in the outer panel.

However, in the above related art, no consideration is given regarding contraction of the foamed filler material (the foamed member) after foaming, and so there is room for improvement with regard to suppressing warping in the outer panel due to the foamed filler material contracting.

SUMMARY

In consideration of the above circumstances, the present disclosure provides a vehicle structure capable of suppressing warping in an outer panel caused by contraction of a foamed member, and a manufacturing method for a vehicle structural component.

A first aspect of the present disclosure is a vehicle structure including: a vehicle framework member; an outer panel that is disposed at a vehicle outer side of the vehicle framework member, and that configures a design face of the vehicle; a foamed member that is disposed as a reinforcing material between the vehicle framework member and the outer panel, and that is formed from a material foamed at a first temperature from a precursor state and then solidifies at a second temperature lower than the first temperature; and a reinforcement member that is interposed between the outer panel and the foamed member in a state in which the outer panel and the foamed member are respectively joined together so as to fix the foamed member to the outer panel, and that is configured from a material having a smaller shrinkage ratio than a shrinkage ratio of the foamed member when the temperature is lowered from the first temperature to the second temperature.

According to the above configuration, the foamed member is disposed as a reinforcing material between the vehicle framework member and the outer panel, and the reinforcement member is interposed between the outer panel and the foamed member. The foamed member is formed from a material foamed at a first temperature from a precursor state and then solidifies at a second temperature lower than the first temperature. Note that in the present disclosure, the foamed member refers to a configuration containing air bubbles. Moreover, the reinforcement member is configured such that the outer panel and the foamed member are respectively joined together so as to fix the foamed member to the outer panel. Thus, the outer panel is reinforced by the reinforcement member and the foamed member.

Even when a load attempting to warp the outer panel acts because of contraction of the foamed member during manufacture, warping in the outer panel is controlled since not only the outer panel, but also the reinforcement member bears the load. The reinforcement member is configured from a material having a shrinkage ratio smaller than the shrinkage ratio of the foamed member when the temperature is lowered from the first temperature to the second temperature and, therefore, since the reinforcement member does not contract by the shrinkage ratio of the foamed member or greater during manufacture, warping in the outer panel can be controlled.

In the present aspect, the reinforcement member may include a plate-shaped main body that is disposed following an inner face of the outer panel; and a surrounding wall that is integrally formed to a peripheral edge of the main body, and that projects out from a face of the main body on the opposite side to a face of the main body facing toward the outer panel.

According to the above configuration, the reinforcement member includes the plate-shaped main body that is disposed following the inner face of the outer panel, and the surrounding wall is integrally formed to the peripheral edge of the main body such that the rigidity of the reinforcement member is raised by the surrounding wall. When the foamed body attempts to contract during manufacture, contraction force from the foamed member acts on the reinforcement member, and attempts to displace the surrounding wall inwards. However, when this occurs, each portion of the surrounding wall works in concert to resist the contraction force from the foamed member, such that deformation of the reinforcement member is effectively controlled. Accordingly, warping in the outer panel when the foamed member attempts to contract may be effectively controlled.

A second aspect of the present disclosure is a manufacturing method for a vehicle structural component in which a foamed member is fixed to an inner face of an outer panel of a vehicle through a reinforcement member, the manufacturing method including: a first process of joining the reinforcement member to the inner face of the outer panel, and disposing a precursor of the foamed member on the opposite side of the reinforcement member to the outer panel; a second process, following the first process, of heating the precursor so as to cause the precursor to foam, and forming the foamed member in a state of contact with the reinforcement member; and a third process, following the second process, of cooling and solidifying the foamed member. The reinforcement member is configured from a material having a shrinkage ratio in the third process smaller than the shrinkage ratio of the foamed member in the third process.

According to the above configuration, in the first process, the reinforcement member is joined to the inner face of the outer panel, and the precursor of the foam member is disposed on the opposite side of the reinforcement member to the outer panel. In the second process following the first process, the precursor of the foamed member is heated so as to cause the precursor of the foamed member to foam, and the foamed member is formed in a state of contact with the reinforcement member. In the third process, following the second process, the foamed member is cooled and solidifies. When this occurs, even when a load attempting to warp the outer panel acts because of contraction of the foamed member, warping in the outer panel is controlled since not only the outer panel, but also the reinforcement member bears the load. The reinforcement member is configured from a material having a shrinkage ratio in the third process smaller than the shrinkage ratio of the foamed member in the third process. Thus, the reinforcement member does not contract by the shrinkage ratio of the foamed member or greater, enabling warping in the outer panel to be controlled.

In the present aspect, the precursor may be joined to the reinforcement member in the first process.

According to the above configuration, the precursor of the foamed member is joined to the reinforcement member in the first process; thus, in the second process, the precursor of the foamed member is foamed and expands from the side of the reinforcement member joined to the outer panel. The position of the foamed member relative to the outer panel is more consistent than in cases in which, for example, a precursor of a foamed member is foamed and expands toward the reinforcement member joined to the outer panel.

In the present aspect, the reinforcement member may include: a plate-shaped main body that is disposed following the inner face of the outer panel; and a surrounding wall that is integrally formed to a peripheral edge of the main body, and that projects out from a face of the main body on the opposite side to a face of the main body facing toward the outer panel.

According to the above configuration, in the first process, the plate-shaped main body of the reinforcement member is disposed following the inner face of the outer panel. When this is performed, the surrounding wall integrally formed to the peripheral edge of the main body faces the opposite side to the outer panel. When the foamed member attempts to contract in the third process, contraction force from the foamed member acts on the reinforcement member, and attempts to displace the surrounding wall inwards. However, when this occurs, each portion of the surrounding wall works in concert to resist the contraction force from the foamed member, such that deformation of the reinforcement member is effectively controlled. Accordingly, warping in the outer panel when the foamed member attempts to contract is effectively controlled.

As explained above, the present disclosure is capable of reducing warping in the outer panel caused by contraction of the foamed member.

BRIEF DESCRIPTION OF THE DRAWINGS

Exemplary embodiments will be described in detail based on the following figures, wherein.

DETAILED DESCRIPTION

First Exemplary Embodiment

Figure 1:
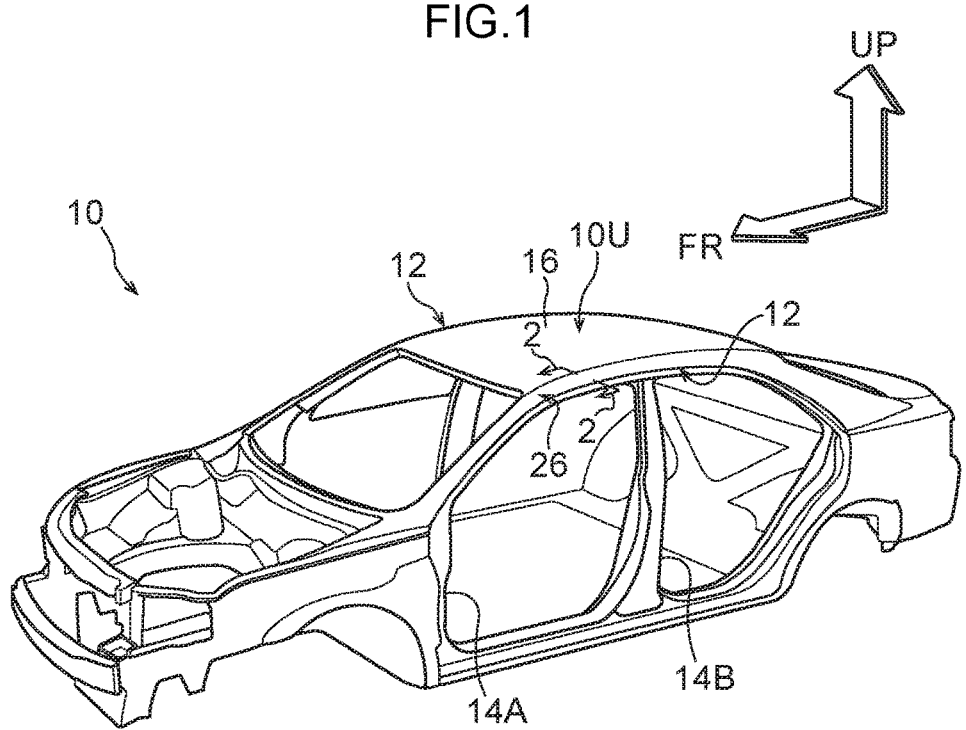
FIG. 1 is an external perspective view illustrating a vehicle applied with a vehicle structure according to a first exemplary embodiment.

Explanation follows regarding a vehicle structure and a manufacturing method for a vehicle structural component according to a first exemplary embodiment, with reference to FIG. 1 to FIG. 3B. Note that in the drawings, the arrow FR indicates the vehicle front side, the arrow UP indicates the vehicle upper side, and the arrow IN indicates the vehicle width direction inner side. Moreover, in the following explanation, unless specifically stated otherwise, reference to the front-rear and left-right directions respectively refer to front and rear in the vehicle front-rear direction and left and right in the vehicle left-right direction (vehicle width direction).

FIG. 1 is an external perspective view illustrating a vehicle 10 applied with a vehicle structure according to the present exemplary embodiment. As illustrated in FIG. 1, roof side-sections 12, configuring both sides of a vehicle upper section 10U, each configure an upper edge of a front door opening 14A and configure an upper edge of a rear door opening 14B.

Figure 2:
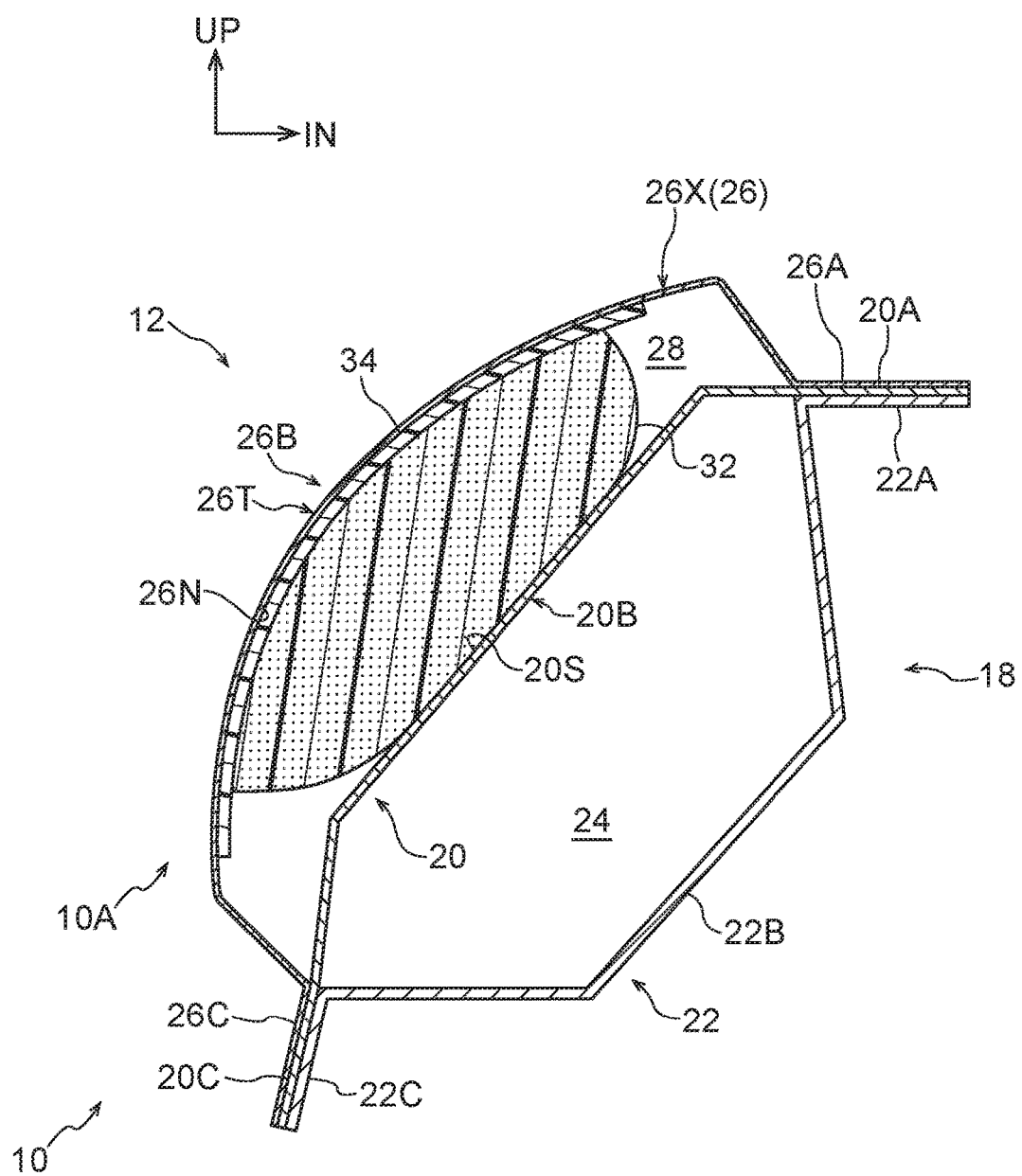
FIG. 2 is an enlarged vertical cross-section illustrating an enlargement of a state sectioned along line 2-2 in FIG. 1.

FIG. 2 is an enlarged vertical cross-section illustrating a state sectioned along line 2-2 in FIG. 1. As illustrated in FIG. 2, a roof side-rail 18, serving as a vehicle framework member, is disposed in the roof side-section 12. The roof side-rail 18 configures framework of the roof side-section 12 and extends along the vehicle front-rear direction.

The roof side-rail 18 includes a roof side-rail outer panel 20 disposed at the vehicle cabin outer side and a roof side-rail inner panel 22 disposed at the vehicle cabin inner side. Note that in the following explanation, the roof side-rail outer panel 20 is shortened to outer panel 20, and the roof side-rail inner panel 22 is shortened to inner panel 22. Both the outer panel 20 and the inner panel 22 are made of steel (in a broader sense, made of metal) in the present exemplary embodiment.

An upper portion of the outer panel 20 is configured by an upper wall 20A extending substantially along the vehicle width direction, and a lower portion of the outer panel 20 is configured by a lower wall 20C extending substantially in the vehicle vertical direction. The outer panel 20 includes an intermediate portion 20B that connects a vehicle width direction outer end of the upper wall 20A and an upper end of the lower wall 20C together. The intermediate portion 20B is inclined toward the vehicle width direction outer side on progression toward the vehicle lower side.

The inner panel 22 is formed with a substantially hat-shape having an opening facing obliquely upward and toward the vehicle width direction outer side, when viewed as in the vertical cross-section from the vehicle rear in FIG. 2. An upper portion of the inner panel 22 is configured by an upper flange 22A extending substantially along the vehicle width direction, and a lower portion of the inner panel 22 is configured by a lower flange 22C extending substantially along the vehicle vertical direction. Moreover, the inner panel 22 includes an intermediate portion 22B that connects a vehicle width direction outer end of the upper flange 22A and an upper end of the lower flange 22C together. The intermediate portion 22B is formed with a substantially U-shape (a substantially staple shape) opening obliquely upward and toward the vehicle width direction outer side.

The upper flange 22A of the inner panel 22 is aligned with and joined to the upper wall 20A of the outer panel 20. The lower flange 22C of the inner panel 22 is also aligned with and joined to the lower wall 20C of the outer panel 20. The roof side-rail 18 includes a closed cross-section portion 24 that is formed by the outer panel 20 and the inner panel 22.

A roof outer side portion 26X, which serves as a vehicle outer panel and is part of an outer side panel 26, is disposed at the vehicle outer side of the roof side-rail 18. The outer side panel 26 configures a design face of the vehicle, and is made of steel (in a broader sense, made of metal) in the present exemplary embodiment. From the perspective of weight reduction, the plate thickness of the outer side panel 26 is set to be thinner than the respective plate thicknesses of the outer panel 20 and the inner panel 22.

The roof outer side portion 26X is formed with a substantially hat-shape with an opening facing obliquely downward and toward the vehicle width direction inner side, when viewed as in the vertical cross-section from the vehicle rear in FIG. 2. An upper portion of the roof outer side portion 26X is configured by an upper flange 26A extending substantially along the vehicle width direction, and a lower portion of the roof outer side portion 26X is configured by a lower flange 26C extending substantially along the vehicle vertical direction. The roof outer side portion 26X includes an intermediate portion 26B connecting a vehicle width direction outer end of the upper flange 26A and an upper end of the lower flange 26C together. The intermediate portion 26B is formed having a substantially U-shape that gently bulges out obliquely upward toward the vehicle width direction outer side. A bulge-apex wall portion 26T configuring a wall apex portion on the bulge-side of the intermediate portion 26B is inclined toward the vehicle lower side on progression toward the vehicle width direction outer side and is curved so as to bulge out slightly: obliquely upward and toward the vehicle width direction outer side.

The upper flange 26A of the roof outer side portion 26X is aligned with and joined to the upper wall 20A of the outer panel 20. The lower flange 26C of the roof outer side portion 26X is aligned with and joined to the lower wall 20C of the outer panel 20. A closed cross-section 28 is formed by the roof outer side portion 26X and the outer panel 20. Although not illustrated in the drawings, vehicle width direction edges of a roof panel 16 (see FIG. 1) are respectively joined to an upper face of the upper flange 26A of each roof outer side portion 26X.

A foamed member 32, acting as a reinforcing material, is disposed between the roof side-rail 18 and the roof outer side portion 26X. The foamed member 32 is made of resin (for example, polyethylene, polypropylene, polystyrene, or the like) and contains air bubbles. The foamed member 32 is formed from a material that is foamed at a specific first temperature from a precursor 30 (see FIG. 3A) state and then solidifies at a specific second temperature lower than the first temperature. The precursor 30 (see FIG. 3A) of the foamed member 32 is formed by a resin containing a foaming agent (for example, sodium bicarbonate).

A sheet-shaped (plate-shaped) reinforcement member 34 is interposed between the bulge-apex wall portion 26T of the roof outer side portion 26X and the foamed member 32. The reinforcement member 34 is respectively joined to the bulge-apex wall portion 26T of the roof outer side portion 26X and the foamed member 32 such that the foamed member 32 is in a state fixed to the bulge-apex wall portion 26T of the roof outer side portion 26X.

The reinforcement member 34 is formed from a fiber reinforced plastic material (prepreg). Specifically, the reinforcement member 34 of the present exemplary embodiment is formed from a thermoset resin member that contains carbon fibers serving as reinforcing fibers. The reinforcing fibers contained in the thermoset resin member may, for example, employ various known fibers such as glass fibers and the like in place of the carbon fibers. The reinforcement member 34 is formed by a material having a shrinkage ratio smaller than the shrinkage ratio of the foamed member 32 when the temperature is lowered from the first temperature (the temperature at which the precursor 30 of the foamed member 32 (see FIG. 3A) is foamed) to the second temperature (the temperature at which the foamed member 32 solidifies). The reinforcement member 34 is slightly curved following an inner face 26N of the bulge-apex wall portion 26T of the roof outer side portion 26X and has, for example, a rectangular shape disposed with its length direction in the vehicle front-rear direction as viewed from the roof side-rail 18.

Manufacturing Method, Operation and Effects of Vehicle Structural Component 10A

Figure 3A:
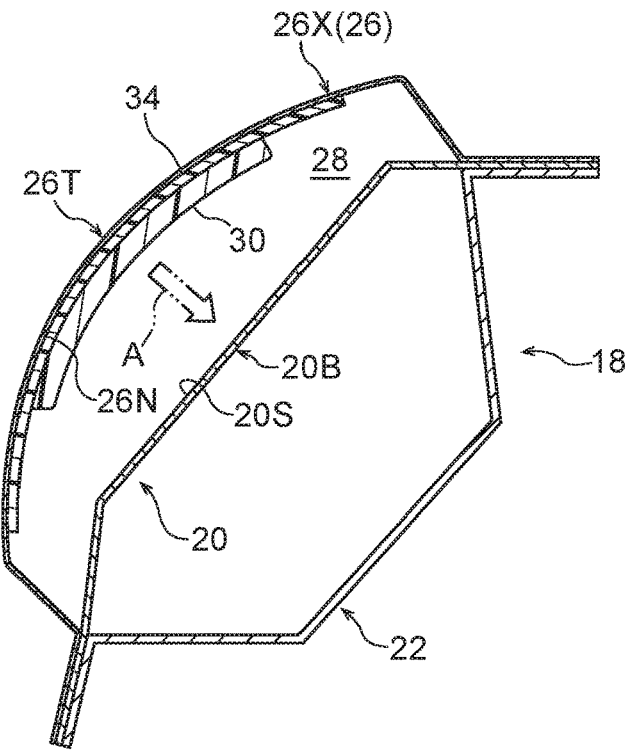
FIG. 3A is a vertical cross-section (diagram illustrating a cross-section sectioned along a position similar to that of FIG. 2) for explaining a manufacturing method for a vehicle structural component according to the first exemplary embodiment and illustrates a state after a first process and before a second process.
Figure 3B:
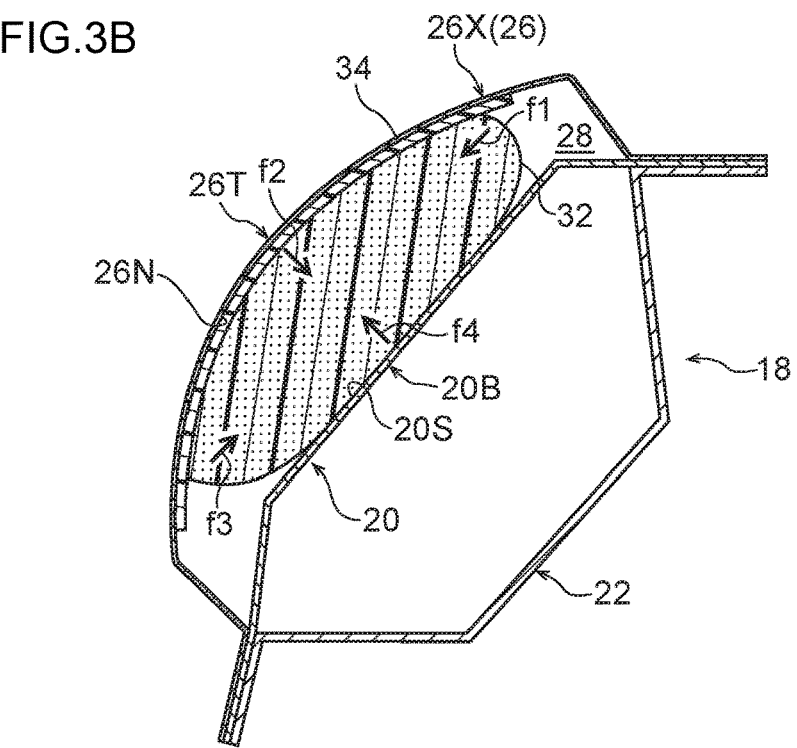
FIG. 3B is a vertical cross-section for explaining a manufacturing method for the vehicle structural component according to the first exemplary embodiment and illustrates a state after the second process.

Next, explanation follows regarding a manufacturing method for a vehicle structural component 10A in which the foamed member 32 is fixed to the inner face 26N of the bulge-apex wall portion 26T of the roof outer side portion 26X illustrated in FIG. 2 through the reinforcement member 34 while referencing FIG. 3A and FIG. 3B, as well as explanation regarding the operation and effects of the present exemplary embodiment. FIG. 3A illustrates a state after a first process and before a second process, and FIG. 3B illustrates a state after the second process; both FIG. 3A and FIG. 3B are vertical cross-sections sectioned along a position similar to that in FIG. 2.

In the first process, the reinforcement member 34 illustrated in FIG. 3A is joined to the inner face 26N of the bulge-apex wall portion 26T of the roof outer side portion 26X, and the precursor 30 of the foamed member 32 (see FIG. 2) is disposed on the opposite side of the reinforcement member 34 to the roof outer side portion 26X. In the first process, for example, the precursor 30 is superimposed on and affixed (joined) onto one face (inner face) of the reinforcement member 34; then another face (outer face) of the reinforcement member 34 is joined to the bulge-apex wall portion 26T of the roof outer side portion 26X by an adhesive. Alternatively, the precursor 30 may be joined to the reinforcement member 34 after the reinforcement member 34 is joined to the bulge-apex wall portion 26T of the roof outer side portion 26X. In the first process of the present exemplary embodiment, a member of sheet-shape pre-molding is, for example, applied as the reinforcement member 34 that will be joined to the bulge-apex wall portion 26T of the roof outer side portion 26X.

In the present exemplary embodiment, the reinforcement member 34, onto which the precursor 30 has been affixed, is joined to the bulge-apex wall portion 26T of the roof outer side portion 26X before joining the roof side-rail 18 and the roof outer side portion 26X together in the state illustrated in FIG. 3A.

In the second process following the first process, the precursor 30 is foamed by heating the location containing the precursor 30 such that the foamed member 32 is formed in a state of contact with the reinforcement member 34, as illustrated in FIG. 3B. When this is performed, the reinforcement member 34 sets due to the heat.

Since the precursor 30 of the foamed member 32 illustrated in FIG. 3A is joined to the reinforcement member 34 in the first process, in the second process, the precursor 30 of the foamed member 32 is foamed and expands from the side of the reinforcement member 34 joined to the roof outer side portion 26X toward the roof side-rail 18 (see arrow A). Thus, the position of the foamed member 32 (see FIG. 2) relative to the roof outer side portion 26X is more consistent than in cases in which a precursor of a foamed member is foamed and expands, for example, toward the reinforcement member 34 joined to a roof outer side portion 26X (namely, toward the opposite direction to the arrow A direction). In the present exemplary embodiment, the foamed member 32 illustrated in FIG. 3B reaches the intermediate portion 20B of the outer panel 20 and is affixed (joined) to an outer face 20S in the second process.

In the third process following the second process, the foamed member 32 illustrated in FIG. 3B is, for example, left such that the foamed member 32 cools and solidifies; the vehicle structural component 10A illustrated in FIG. 2 is thus obtained. When this is performed, even when a load attempting to warp the roof outer side portion 26X side acts because of contraction of the foamed member 32 illustrated in FIG. 3B, warping in the roof outer side portion 26X is suppressed since not only the roof outer side portion 26X but also the reinforcement member 34 bears the load. Note that the arrows f1, f2, f3, and f4 shown in FIG. 3B indicate directions in which the foamed member 32 attempts to contract.

Moreover, the reinforcement member 34 is formed by a material having a smaller shrinkage ratio in the third process than the shrinkage ratio of the foamed member 32 in the third process (in other words, a material having a smaller shrinkage ratio than that of the foamed member 32 when the temperature is lowered from the first temperature, this being the temperature at which the precursor 30 (see FIG. 3A) of the foamed member 32 is foamed, to the second temperature, this being the temperature at which the foamed member 32 solidifies). Thus, the reinforcement member 34 does not contract by the shrinkage ratio of the foamed member 32 or greater, enabling warping in the roof outer side portion 26X to be controlled.

As explained above, warping in the roof outer side portion 26X (outer side panel 26) due to contraction of the foamed member 32 may be controlled in the present exemplary embodiment.

Further, in the vehicle structural component 10A illustrated in FIG. 2, the bulge-apex wall portion 26T of the roof outer side portion 26X may be reinforced by the reinforcement member 34 and the foamed member 32 owing to the foamed member 32 being fixed to the inner face 26N of the bulge-apex wall portion 26T of the roof outer side portion 26X through the reinforcement member 34.

Second Exemplary Embodiment

Figure 4A:
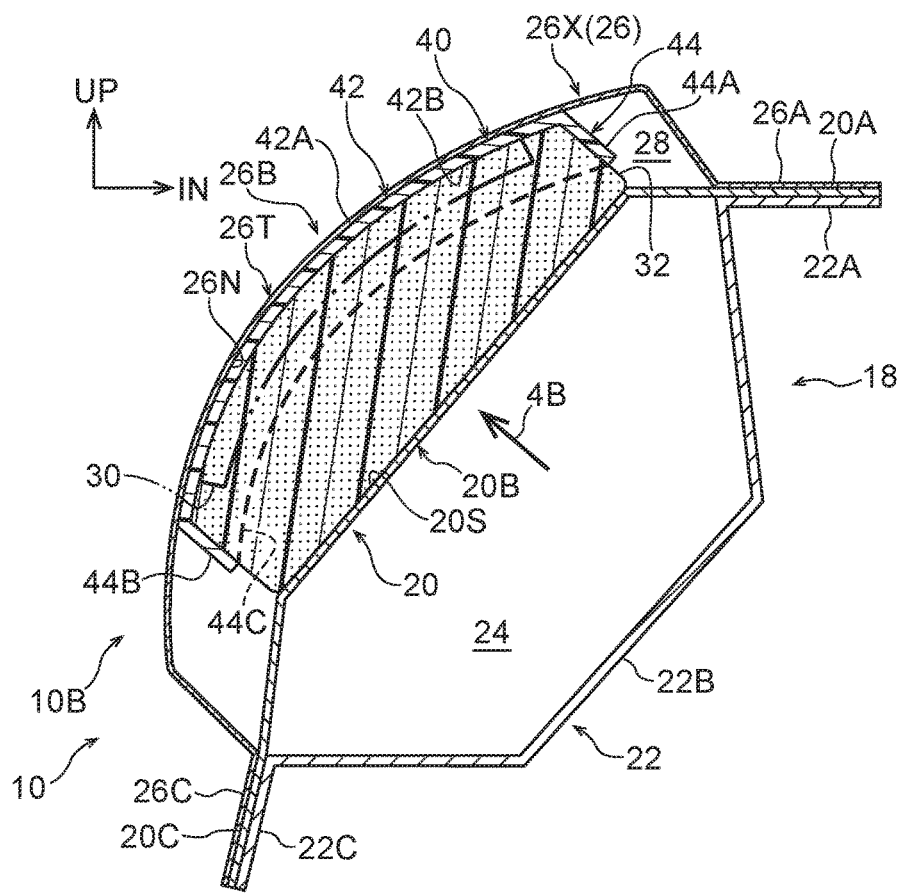
FIG. 4A is a vertical cross-section illustrating relevant portions of a vehicle structure according to a second exemplary embodiment.
Figure 4B:
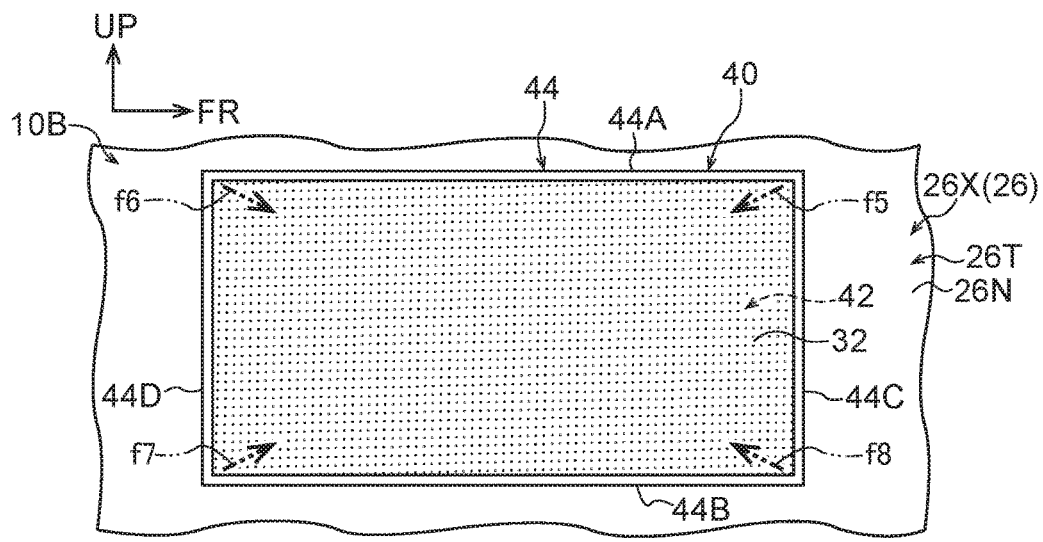
FIG. 4B is a schematic demagnification in which a roof side-rail outer panel is in a see-through state, as viewed along the direction of arrow 4B in FIG. 4A.

Next, explanation follows regarding a second exemplary embodiment, with reference to FIG. 4A and FIG. 4B. FIG. 4A and FIG. 4B illustrate relevant portions of a vehicle structure according to the second exemplary embodiment. FIG. 4A is a vertical cross-section sectioned along a position similar to that of FIG. 2, and FIG. 4B is a schematic demagnification in which the outer panel 20 is in a see-through state, as viewed along the direction of arrow 4B in FIG. 4A.

As illustrated in FIG. 4A and FIG. 4B, the second exemplary embodiment differs from the first exemplary embodiment in that a reinforcement member 40 includes a surrounding wall 44. Other configuration is similar to the configuration in the first exemplary embodiment. Components that are similar to those of the first exemplary embodiment are therefore appended with the same reference numerals, and explanation thereof is omitted. Moreover, for the sake of convenience, in FIG. 4A and FIG. 4B, the vehicle 10 is appended with the same reference numerals as in the first exemplary embodiment.

As illustrated in FIG. 4A, the reinforcement member 40 is a component similar to the reinforcement member 34 (see FIG. 2) in the first exemplary embodiment, except in that the reinforcement member 40 includes the surrounding wall 44; the reinforcement member 40 is a molded component configured by the same material as that of the reinforcement member 34 (see FIG. 2) in the first exemplary embodiment.

The reinforcement member 40 includes a plate-shaped main body 42 disposed with a slight curve so as to follow the inner face 26N of the bulge-apex wall portion 26T of the roof outer side portion 26X. Similar to the reinforcement member 34 (see FIG. 2) in the first exemplary embodiment, the main body 42 has a rectangular shape as viewed from the roof side-rail 18 and is disposed with its length direction in the vehicle front-rear direction (see FIG. 4B). Note that although the main body 42 is not directly shown in FIG. 4B; however, the main body 42 is disposed behind the foamed member 32 in FIG. 4B. As illustrated in FIG. 4A, the short square tube shaped surrounding wall 44 is integrally formed to peripheral edges of the main body 42. The surrounding wall 44 projects out from a face 42B of the main body 42 on the opposite side to a face 42A of the main body 42 facing toward the roof outer side portion 26X. Namely, the surrounding wall 44 projects out toward the roof side-rail 18.

As illustrated in FIG. 4B, the surrounding wall 44 includes an upper wall 44A that forms an upper end of the surrounding wall 44, a lower wall 44B that forms a lower end of the surrounding wall 44, a front wall 44C that connects vehicle-front side ends of the upper wall 44A and the lower wall 44B together, and a rear wall 44D that connects vehicle-rear side ends of the upper wall 44A and the lower wall 44B together. The shape of the rear wall 44D as viewed from the vehicle-rear is a shape similar to that of the front wall 44C illustrated in FIG. 4A.

The manufacturing method for a vehicle structural component 10B, in which the foamed member 32 is fixed to the inner face 26N of the bulge-apex wall portion 26T of the roof outer side portion 26X illustrated in FIG. 4A through the reinforcement member 40, is similar to in the first exemplary embodiment. Similar operation and effects to those of the first exemplary embodiment as described above can also be obtained by the configuration of the present exemplary embodiment.

In the first process of the manufacturing method for the vehicle structural component 10B of the present exemplary embodiment, a molded component, which is pre-molded into the shape of the reinforcement member 40 illustrated in FIG. 4A and FIG. 4B, is applied as the reinforcement member 40 joined to the inner face 26N of the bulge-apex wall portion 26T of the roof outer side portion 26X. Moreover, in the first process, the plate-shaped main body 42 of the reinforcement member 40 is disposed following the inner face 26N of the bulge-apex wall portion 26T of the roof outer side portion 26X. When this is performed, the surrounding wall 44 integrally formed to the peripheral edges of the main body 42 faces toward the opposite side to the roof outer side portion 26X.

Moreover, in the second process of the manufacturing method for the vehicle structural component 10B, the range in which the foamed member 32 will be formed (foaming range) can be controlled by the surrounding wall 44 when forming the foamed member 32 in a state of contact with the reinforcement member 40.

In the third process of the manufacturing method for the vehicle structural component 10B, the foamed member 32 illustrated in FIG. 4B attempts to contract. The arrows f5, f6, f7, and f8 shown in FIG. 4B indicate directions in which the foamed member 32 attempts to contract. When the foamed member 32 attempts to contract in this manner, contraction force from the foamed member 32 acts on the reinforcement member 40 and attempts to displace the surrounding wall 44 inwards. However, when this occurs, each portion of the surrounding wall 44 works in concert to resist the contraction force from the foamed member 32 such that deformation of the reinforcement member 40 is effectively controlled. Accordingly, warping in the roof outer side portion 26X (the outer side panel 26) when the foamed member 32 attempts to contract may be even more effectively controlled.

Further, also in the vehicle structural component 10B illustrated in FIG. 4A, the rigidity of the reinforcement member 40 is raised due to the surrounding wall 44 being formed around the peripheral edges of the reinforcement member 40, enabling the roof outer side portion 26X to be effectively reinforced.

Third Exemplary Embodiment

Figure 5:
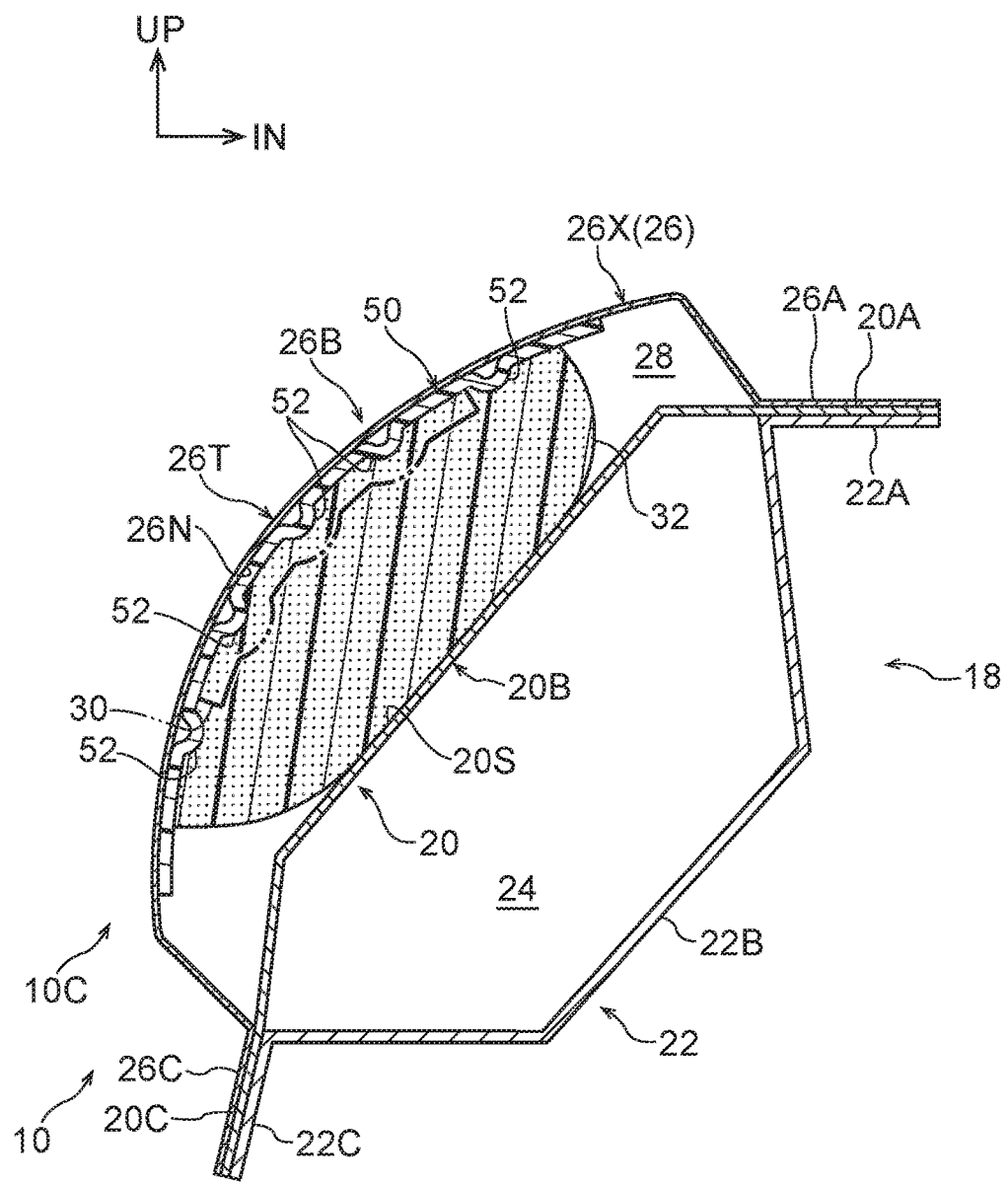
FIG. 5 is a vertical cross-section illustrating relevant portions of a vehicle structure according to a third exemplary embodiment.

Next, explanation follows regarding a third exemplary embodiment with reference to FIG. 5. FIG. 5 is a vertical cross-section illustrating relevant portions of a vehicle structure according to the present exemplary embodiment. As illustrated in FIG. 5, the present exemplary embodiment differs from the first exemplary embodiment in that beads 52 are formed on a reinforcement member 50. Other configuration is similar to that of the first exemplary embodiment. Components that are similar to those of the first exemplary embodiment are therefore appended with the same reference numerals, and explanation thereof is omitted. Moreover, for the sake of convenience, in FIG. 5, the vehicle 10 is appended with the same reference numerals as in the first exemplary embodiment.

As illustrated in FIG. 5, the reinforcement member 50 is a component similar to the reinforcement member 34 (see FIG. 2) in the first exemplary embodiment, except in that the reinforcement member 50 is formed with the beads 52; the reinforcement member 50 is a molded component configured by the same material as that of the reinforcement member 34 (see FIG. 2) in the first exemplary embodiment. The plate-shaped reinforcement member 50 includes the beads 52 formed by portions of the reinforcement member 50 bulging out toward the opposite side to the roof outer side portion 26X. The beads 52 are formed with elongated shapes along the vehicle front-rear direction, and plural of the beads 52 are provided parallel to each other; the cross-section profile of each bead 52 is formed in a substantially semi-circular arc shape opening toward the roof outer side portion 26X, as viewed along the vehicle front-rear direction.

The manufacturing method for a vehicle structural component 10C, in which the foamed member 32 is fixed to the inner face 26N of the bulge-apex wall portion 26T of the roof outer side portion 26X illustrated in FIG. 5 through the reinforcement member 50, is similar to in the first exemplary embodiment. Similar operation and effects to those of the first exemplary embodiment as described above are also obtained by the configuration of the present exemplary embodiment.

Note that in the first process of the manufacturing method for the vehicle structural component 10C of the present exemplary embodiment, a molded component, which is pre-molded into the shape of the reinforcement member 50 illustrated in FIG. 5, is applied as the reinforcement member 50 joined to the inner face 26N of the bulge-apex wall portion 26T of the roof outer side portion 26X.

Moreover, in the present exemplary embodiment, the rigidity of the reinforcement member 50 is raised by the beads 52, such that deformation of the reinforcement member 50 is effectively controlled when the foamed member 32 attempts to contract in the third process of the manufacturing method for the vehicle structural component 10C. Accordingly, warping in the roof outer side portion 26X (outer side panel 26) when the foamed member 32 attempts to contract is even more effectively controlled.

Fourth Exemplary Embodiment

Figure 6:
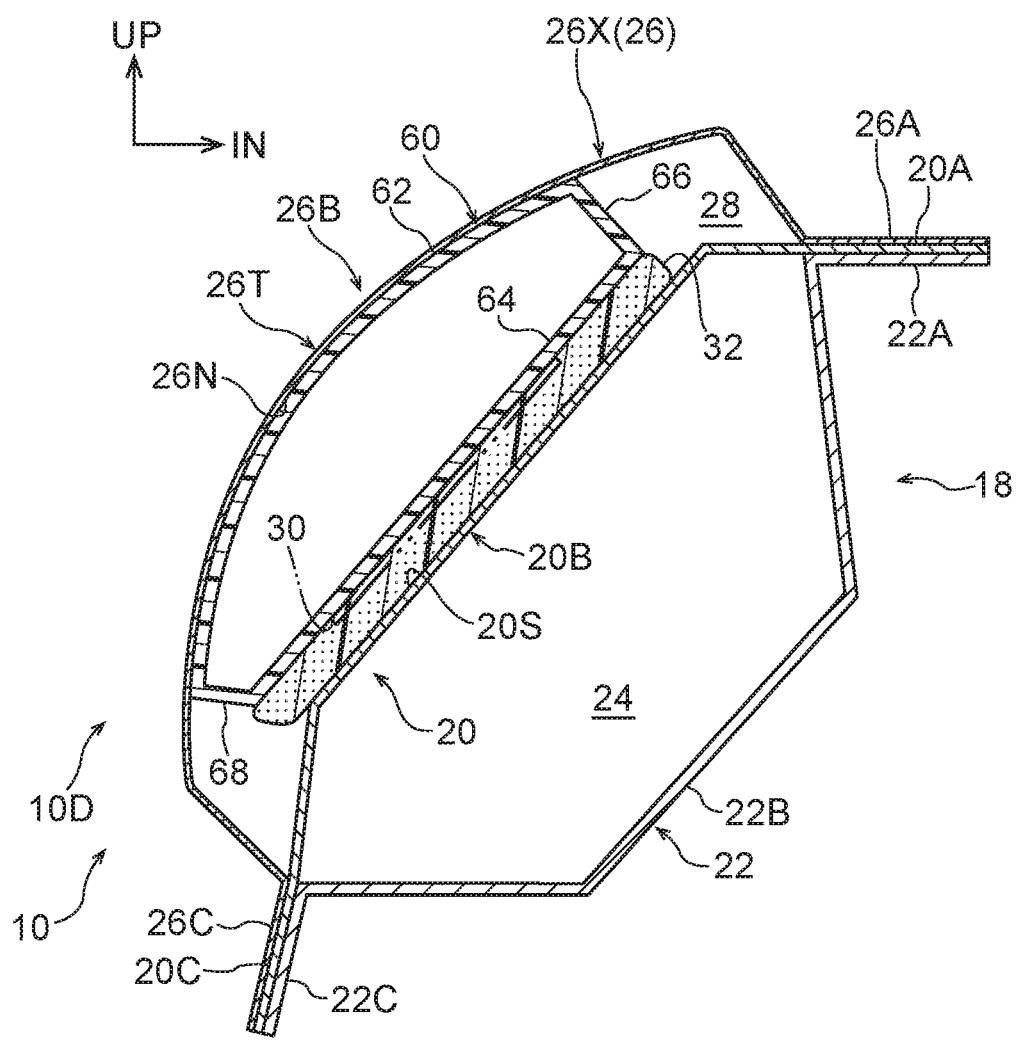
FIG. 6 is a vertical cross-section illustrating relevant portions of a vehicle structure according to a fourth exemplary embodiment.

Next, explanation follows regarding a fourth exemplary embodiment, with reference to FIG. 6. FIG. 6 is a vertical cross-section illustrating relevant portions of a vehicle structure according to the present exemplary embodiment. As illustrated in FIG. 6, the present exemplary embodiment differs from the first exemplary embodiment in that a reinforcement member 60 is not sheet-shaped. Other configuration is similar to that of the first exemplary embodiment. Components that are similar to those of the first exemplary embodiment are therefore appended with the same reference numerals, and explanation thereof is omitted. Moreover, for the sake of convenience, in FIG. 6, the vehicle 10 is appended with the same reference numerals as in the first exemplary embodiment.

As illustrated in FIG. 6, the reinforcement member 60 is a component similar to the reinforcement member 34 (see FIG. 2) in the first exemplary embodiment, except in that the reinforcement member 60 is not sheet-shaped; and the reinforcement member 60 is configured by a molded component configured by the same material as that of the reinforcement member 34 (see FIG. 2) in the first exemplary embodiment and formed in a substantially tube shape. In the present exemplary embodiment, the reinforcement member 60 is a molded component formed with a substantially tube shape; however, the reinforcement member may be configured by a solid molded component having an outer surface profile similar to that of the reinforcement member 60.

The reinforcement member 60 includes an outer wall 62 that is joined to the bulge-apex wall portion 26T of the roof outer side portion 26X in a state of surface contact therewith, an inner wall 64 to which the foamed member 32 is joined, an upper wall 66 that connects upper ends of the outer wall 62 and the inner wall 64 together, and a lower wall 68 that connects lower ends of the outer wall 62 and the inner wall 64 together. The inner wall 64 of the reinforcement member 60 is disposed substantially parallel to the intermediate portion 20B of the outer panel 20. The distance between the inner wall 64 of the reinforcement member 60 and the intermediate portion 20B of the outer panel 20 is set to a shorter distance than the shortest distance between the inner wall 64 of the reinforcement member 60 and the outer wall 62 of the reinforcement member 60.

The manufacturing method for a vehicle structural component 10D, in which the foamed member 32 is fixed to the inner face 26N of the bulge-apex wall portion 26T of the roof outer side portion 26X illustrated in FIG. 6 through the reinforcement member 60, is similar to in the first exemplary embodiment. Similar operation and effects to those of the first exemplary embodiment as described above are also obtained by the configuration of the present exemplary embodiment.

Note that in the first process of the manufacturing method for the vehicle structural component 10D of the present exemplary embodiment, a molded component, which is pre-molded into the shape of the reinforcement member 60 illustrated in FIG. 6, is applied as the reinforcement member 60 joined to the inner face 26N of the bulge-apex wall portion 26T of the roof outer side portion 26X.

Moreover, in the present exemplary embodiment, the rigidity of the reinforcement member 60 is raised due to the reinforcement member 60 being configured with a tubular structure such that when the foamed member 32 attempts to contract in the third process of the manufacturing method for the vehicle structural component 10D, deformation of the reinforcement member 60 is effectively controlled and warping in the roof outer side portion 26X is even more effectively controlled. Moreover, the volume of the foamed member 32 may be reduced by setting the inner wall 64 of the reinforcement member 60 to a position near the intermediate portion 20B of the outer panel 20. Thus, load acting on the reinforcement member 60 can also be reduced when the foamed member 32 attempts to contract in the third process.

Supplementary Explanation of Exemplary Embodiments

In the above exemplary embodiments, the foamed member 32 illustrated in FIG. 2; and the reinforcement member 34, 40, 50, or 60 are disposed between the roof side-rail 18 and the roof outer side portion 26X (the outer side panel 26). However, a foamed member and a reinforcement member may, for example, be disposed between some other vehicle framework member and a vehicle outer panel: for example, between a pillar (a structural member including pillar reinforcement), serving as a vehicle framework member, and an outer side panel, serving as a vehicle outer panel.

Moreover, in the above exemplary embodiments, the roof side-rail 18 is configured by the outer panel 20 and the inner panel 22; however, a configuration in which, for example, the outer panel 20 is not disposed may also be adopted. In such cases, for example, configuration may be made in which the vehicle structural component 10A, 10B, 10C, or 10D is manufactured; then, the upper flange 22A of the inner panel 22 and the upper wall 20A of the outer panel 20 are joined together, and the lower flange 22C of the inner panel 22 and the lower wall 20C of the outer panel 20 are joined together.

In the above exemplary embodiments, the foamed member 32 reaches the intermediate portion 20B of the outer panel 20 and is affixed to the outer face 20S in the second process; however, a mode may be adopted in which a foamed member does not reach a framework member in the second process, with the foamed member and the framework member separated from each other.

In the first process in the above exemplary embodiments, the precursor 30 (see FIG. 3A and so on) of the foamed member 32 is joined to the reinforcement member 34, 40, 50, or 60; however, in the first process, the precursor of the foamed member may, for example, be disposed on the opposite side of the reinforcement member to the vehicle outer panel, and the precursor may be joined to a vehicle framework member or the like without being joined to the reinforcement member.

Moreover, in the first process of the first exemplary embodiment, the reinforcement member 34 is joined to the bulge-apex wall portion 26T of the roof outer side portion 26X using an adhesive; however, the reinforcement member may be joined to the vehicle outer panel using a joining method other than an adhesive.

In the above exemplary embodiments, the reinforcement member 34, 40, 50, or 60 is formed by a fiber reinforced plastic material. However, the reinforcement member may, for example, be formed from a resin member which does not contain fiber, or may be a member formed from, for example, a steel material, an aluminum alloy material, a carbon material, or the like.

As a modified example of the above exemplary embodiments, a configuration may be adopted in which ribs for improving rigidity are formed to the reinforcement member 34, 40, 50, or 60.

As a modified example of the fourth exemplary embodiment, a reinforcement member configured with a block shape with an outer surface profile similar to that of the reinforcement member 60 and that is formed from thermoset resin formed prior to the first process; and that is formed, at least at a portion, including a porous portion containing air bubbles may be disposed in place of the tube-shaped reinforcement member 60 illustrated in FIG. 6.

In the above exemplary embodiments, the outer panel 20, the inner panel 22, and the outer side panel 26 are all made of steel; however, the framework members and the vehicle outer panel may, for example, be formed from a material other than steel, such as a material made of aluminum alloy, carbon, or resin (including fiber reinforced plastic).

Combinations of the above exemplary embodiments and the plural modified examples described above may be implemented as appropriate.

Examples of the present disclosure have been given above; however, the present disclosure is not limited to the above, and obviously various other modifications may be implemented within a range not departing from the spirit of the present disclosure.

What is claimed is:
1. A vehicle structure comprising:
  a vehicle framework member comprising a framework inner panel and a framework outer panel, the framework inner panel joined to the framework outer panel at edge regions thereof so as to define a closed cavity therebetween;

an outer side panel that is disposed at a vehicle outer side of the framework outer panel of the vehicle framework member, and that configures a design face of a vehicle;

a foamed member that is disposed as a reinforcing material between the vehicle outer side of the framework outer panel and the outer side panel, and that is formed from a material foamed at a first temperature from a precursor state and then solidifies at a second temperature lower than the first temperature; and a reinforcement member that is interposed between the outer side panel and the foamed member by being joined to the outer side panel with a first face and by being joined to the foamed member with a second face so as to fix the foamed member to the outer side panel via the reinforcement member, and the reinforcement member being configured from a material having a smaller shrinkage ratio than a shrinkage ratio of the foamed member when the temperature is lowered from the first temperature to the second temperature.

2. The vehicle structure of claim 1, wherein the reinforcement member comprises:

a plate-shaped main body that is disposed following an inner face of the outer side panel; and a surrounding wall that is integrally formed to a peripheral edge of the main body, and that projects out from a face of the main body on the opposite side to a face of the main body facing the outer side panel.

3. The vehicle structure of claim 1, wherein the reinforcement member comprises a plate-shaped main body that is disposed following an inner face of the outer side panel, the main body including a bead that is bulging out toward an opposite side to the outer side panel.

4. The vehicle structure of claim 1, wherein the reinforcement member comprises a substantially tube shape member that extends along a vehicle front-rear direction following an inner face of the outer side panel, the tube shape member including an outer wall that surface-contacts with the inner face of the outer side panel, and an inner wall opposing the outer wall and to which the foamed member is joined.

5. A manufacturing method for a vehicle structural component in which a foamed member is fixed to an inner face of an outer side panel of a vehicle through a reinforcement member, the manufacturing method comprising:

a first process of joining the reinforcement member to the inner face of the outer side panel, and disposing a precursor of the foamed member on the opposite side of the reinforcement member to the outer side panel;

a second process, following the first process, of heating the precursor so as to cause the precursor to foam, and forming the foamed member in a state of contact with the reinforcement member; and a third process, following the second process, of cooling and solidifying the foamed member; wherein the reinforcement member is configured from a material having a shrinkage ratio in the third process smaller than the shrinkage ratio of the foamed member in the third process, and the vehicle structural component includes a vehicle framework member comprising a framework inner panel and a framework outer panel, the framework inner panel joined to the framework outer panel at edge regions thereof so as to define a closed cavity therebetween, and a face of the foamed member, opposite a face of the foamed member that contacts the reinforcement member, contacting a vehicle outer side surface of the framework outer panel.

6. The manufacturing method for the vehicle structural component of claim 5, wherein the precursor is joined to the reinforcement member in the first process.

7. The manufacturing method for the vehicle structural component of claim 5, wherein the reinforcement member comprises:

a plate-shaped main body that is disposed following the inner face of the outer side panel; and a surrounding wall that is integrally formed to a peripheral edge of the main body, and that projects out from a face of the main body on the opposite side to a face of the main body facing the outer side panel.

* * * * *